July 3, 1945.  E. L. HALL  2,379,518
RECOVERY OF VALUABLE HYDROCARBONS
Filed Oct. 26, 1939
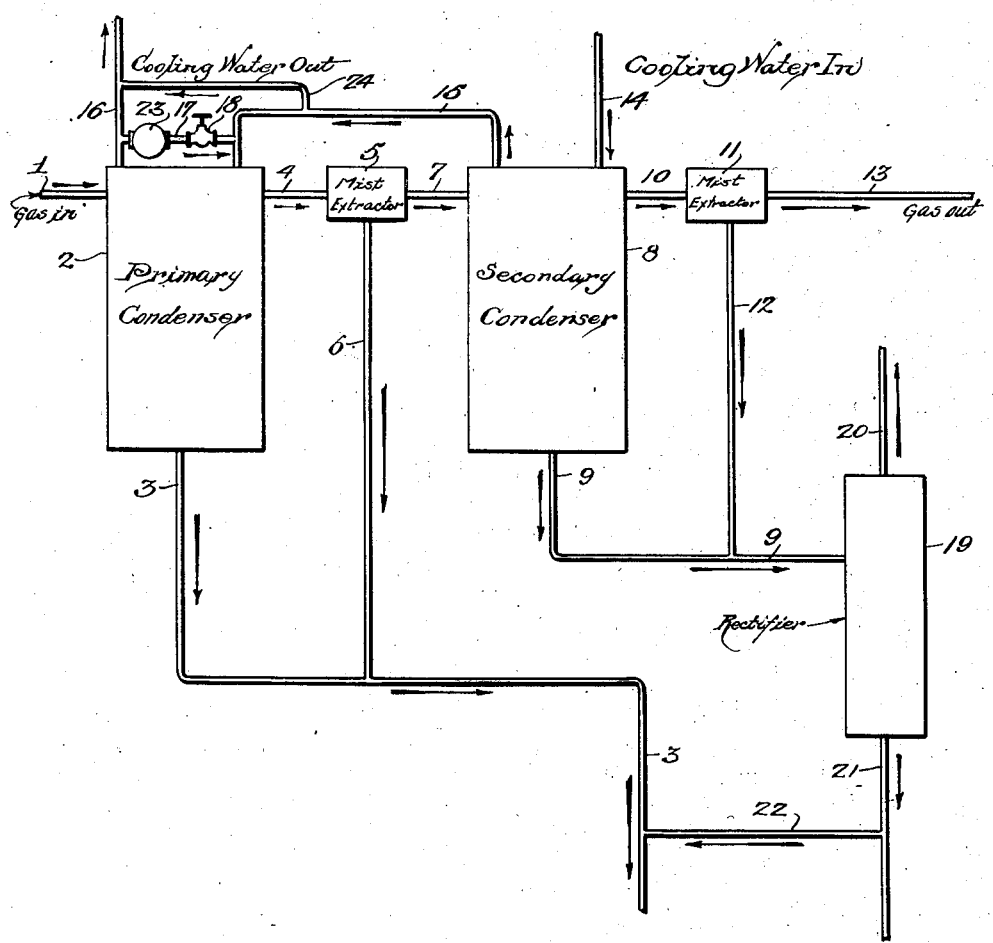
Inventor.
Edwin L Hall
By his Attorney
Hugo G. Kemman Patented July 3, 1945

2,379,518

UNITED STATES PATENT OFFICE 2,379,518

RECOVERY OF VALUABLE HYDROCARBONS

Edwin L. Hall, Philadelphia, Pa., assignor to The United Gas Improvement Company, a corporation of Pennsylvania Application October 26, 1939, Serial No. 301,330

8 Claims. (Cl. 202—69)

This invention pertains generally to the removal and recovery of valuable hydrocarbons from gas.

The invention pertains more particularly to the recovery of valuable hydrocarbons from a manufactured gas produced by the pyrolytic decomposition of hydrocarbon oil with or without the aid of catalysts.

Various processes for the manufacture of artificial gases such as carburetted water gas and oil gas wherein a petroleum oil is decomposed under the influence of heat and/or catalysts result in mixtures containing normally gaseous constituents, such as methane, ethane, ethylene, propylene, etc., as well as some hydrogen. Present also may be the vapors of relatively readily condensible hydrocarbon substances, such as styrene, indene, methyl styrene, cyclopentadiene, isobutylene, isoprene, piperylene, butadiene, etc. These last-named substances are of the resin-forming unsaturated type of hydrocarbons and, since they are generally of commercial importance, it is desirable to devise ways and means for separating them from the gas and from each other.

In general, methods of separation involve the use of compression, refrigeration, adsorption and/or absorption in treating gas containing valuable constituents such as these. They are recovered in the form of condensates or tar distillates which constitute crude material from which the desired products are eventually separated and recovered in more or less pure form according to the degree of purity desired.

I have discovered that when the gas is cooled to a temperature below about 90° F. (or slightly higher) appreciable quantities of certain $C_5$ hydrocarbon compounds (e. g., cyclopentadiene, $C_5H_6$, isoprene and its isomer piperylene, $C_5H_8$) are scrubbed or removed from the gas at that stage by heavier hydrocarbon condensate due to the mutual solubility of the $C_5$ compounds and the heavier hydrocarbons.

These $C_5$ compounds tend to dimerize or polymerize or copolymerize in the liquid phase either with each other or with other compounds, under the influence of heat during distillation of the tar and with the passage of time. Certain of these polymerization products are relatively stable and are then found associated with the saturated aromatics and the unsaturated aromatics that are recovered such as by distillation from the tar.

As an example some of the polymerized compounds formed from the $C_5$ hydrocarbons boil at about the same temperature as the resin-forming hydrocarbon styrene or the saturated hydrocarbon xylene, and others boil at about the same temperature as the resin-forming hydrocarbon methyl styrene. Hence, when once allowed to remain in admixture in the tar for any considerable time, they are very difficult to separate by fractional distillation or otherwise from the various hydrocarbon fractions derived from the tar.

One object of my invention therefore is to avoid the necessity for relatively difficult and expensive operations for the purification of the various aromatic resin-forming hydrocarbons (of which styrene is an example) recovered from the gas.

Another object of my invention is to separate and recover valuable hydrocarbons from manufactured gas while at the same time minimizing any mixing of the aromatic resin-forming hydrocarbons and the $C_5$ diene hydrocarbons.

Still another object of my invention is to separate and recover valuable hydrocarbons from manufactured gas in such a manner as to minimize the harmful results of such mixing of the aromatic resin-forming hydrocarbons and the $C_5$ diene hydrocarbons as unavoidably occurs in the prior art.

With these and other objects in view my invention may be broadly described as comprising (a) conducting the initial condensation treatment to which the freshly generated gas from the gas generating equipment is subjected at temperatures high enough (regardless of the temperature of the river or other water then available for cooling) to insure minimum separation of $C_5$ diene resin-forming hydrocarbons along with the aromatic resin-forming hydrocarbons separated from the gas at that particular stage and (b) subjecting the two types of hydrocarbon compounds as they are recovered in subsequent condensing stages to a separatory treatment substantially immediately so that the $C_5$ diene hydrocarbons do not have sufficient time while still mixed with the aromatic resin-forming hydrocarbons to polymerize to any great extent.

To this end I may provide a condensing system comprising a primary condenser and a secondary condenser. The gas from the gas generating unit is rarely cooled in the primary condenser to a temperature below, say, about 90° F. I also preferably provide a mist extractor following each condenser or employ condensers designed to also extract mist to eliminate the effect of carrying over condensate from one cooling zone to another by mechanical entrainment. The condensate from the secondary condenser is preferably conducted directly to a rectifier from which an overhead cut of dienes substantially free from resin-forming unsaturated aromatic hydrocarbons may be removed and recombined with the manufactured gas leaving the condensers or condensed and taken to storage, and a bottom (or residue) to a still recovery system, or otherwise disposed of as desired.

My invention may be more particularly described in connection with the accompanying drawing, the sole figure of which constitutes a flow sheet illustrating one manner in which the invention may be put in practice. Other equivalent procedures and arrangements will suggest themselves to those skilled in the art upon becoming familiar with my invention.

Fresh gas from gas generating equipment (not shown) is introduced by way of conduit 1 to primary condenser 2. The gas may be at temperatures of the order of 205° F. after leaving the wash box of the generating equipment. The condenser 2 may be a condenser of conventional or other design such as a surface condenser and is supplied with cooling water in such a manner (to be described) that the gas exits therefrom at temperatures rarely below, say, about 90° F.

Condensate separated from the gas within the condenser 2 may be withdrawn through pipe 3. The condensate from this primary condensing stage will contain little or no dienes to dimerize or polymerize in storage or upon heating, due to the approximately 90° F. minimum temperature maintained in condenser 2.

Gas flows from condenser 2 at temperatures of, say, about 90° to 100° F. by means of pipe 4 and into a mist extractor 5. This mist extractor 5 may be of any conventional or other design such as is provided with baffles and/or porous material (e. g. steel wool) adapted to separate entrained droplets from gas. The condensate thus separated may be drained through pipe 6 and added to the condensate from condenser 2.

The gas may then flow via pipe 7 into a secondary condenser 8 which is of course maintained at a lower temperature than that of condenser 2. Condenser 8 is so operated that the condensate therefrom will contain mostly benzene and toluene, with the remainder of the styrene, and the solvent naphtha and some dienes. Condensate may be withdrawn from the condenser 8 through pipe 9.

The gas leaves condenser 8 via pipe 10 and enters a mist extractor 11 which may be similar in construction to mist extractor 5. From mist extractor 11 condensate separated therein is drained through pipe 12 and may be added to the condensate leaving condenser 8 through pipe 9. The gas thus partially cooled and partially freed of relatively condensible hydrocarbons may be conducted through pipe 13 to apparatus (not shown) for the recovery of further condensate such as the bulk of the $C_5$ and/or $C_4$ hydrocarbons, or otherwise disposed of as desired.

Returning to condensers 2 and 8, they may if desired be cooled by the circulation of a cooling medium, such as water, passing therethrough in series. As shown, the cooling water may enter the secondary condenser 8 through pipe 14. The cooling water leaves this condenser by pipe 15 which conducts it to the primary condenser 2. Spent cooling water leaves the condenser 2 by way of pipe 16.

Since the water that is used as the cooling medium in large scale plant practice is generally any readily available surface water (e. g., river water), it will obviously fluctuate widely in temperature during the course of the year.

To avoid such fluctuations and to maintain the desired minimum temperature of about 90° F. at the gas outlet of the primary condenser, I may provide a by-pass conduit 17 for recirculating as much as may be necessary of the warm spent cooling water from the pipe 16 to the water inlet 15 to the primary condenser. The by-pass is provided with a pump 23 and a thermostatically operated control valve 18 which may operate in response to the gas temperatures in the outlet 4 of the condenser 2. By this or equivalent means the desired gas temperatures are maintained therein. Thus, if desired, a by-pass 24 around primary condenser 2 may be provided for causing any desired proportion of the water from condenser 8 to be discharged directly to waste. By thus diminishing the flow of water into condenser 2 the exit gas temperatures may be controlled at will. In the latter case where the gas temperatures are controlled by reducing the quantity of cooling water to the primary condenser, however, care must be taken to avoid local overcooling of the gas near the point where the water is admitted to condenser 2.

The condensate recovered in the primary condenser 2, if operated as above described, and in the mist extractor 5, as previously indicated, contains little or no $C_5$ diene hydrocarbons and may be conducted by pipe 3 to storage or immediately to processing equipment (not shown) for further separation and recovery of aromatic resin-forming hydrocarbons. Due to the absence or near-absence of $C_5$ diene hydrocarbon contaminants, the subsequent treatment is greatly simplified.

As also previously indicated, the condensate from the gas recovered in the secondary condenser 8 and its mist extractor 11 may contain benzene, toluene, styrene, solvent naphtha and some $C_5$ diene hydrocarbons. In order to minimize the undesirable dimerization and polymerization of these dienes, and to recover the styrene without contamination, this portion of condensate is preferably conducted via pipe 9 directly to a distilling or rectifying column 19, which may be operated in conventional manner or otherwise.

In the rectifier 19 the dienes may be separated from the remaining hydrocarbon constituents of the condensate and passed overhead through pipe 20 to a separate condenser (not shown) and storage, or, if desired, to the conduit 13 where they are returned to the gas on its way to further recovery equipment, if provided.

The hydrocarbon liquid, free from dienes, is continuously, or continually, withdrawn from the bottom of the rectifier 19 by means of pipe 21. This residue will contain any heavier aromatic resin forming hydrocarbons (e. g., styrene, indene, methyl styrene, etc.) recovered in secondary condenser 8 and mist extractor 11 and may be conducted to separate recovery equipment (not shown), or it may be combined with the condensate from the primary condenser via pipe 22, for further treatment therewith, or otherwise disposed of as desired.

Although I have described my invention along the lines of a preferred embodiment, it is not limited to these details.

Thus I may provide more than two condensing stages. Furthermore, cooling water need not be circulated countercurrently through the condensers in series, but may be supplied independently to each condenser, although the temperature in the primary condenser should be controlled as previously indicated. There is then an outstanding advantage in the countercurrent flow of cooling water from the standpoint of efficient use of available cooling water and its temperature regulation for primary condenser purposes.

While my process has been described as particularly applicable to the treatment of gas obtained by a process involving the decomposition of hydrocarbon oil such as in the manufacture of carburetted water gas and oil gas, it will be understood that it may also be applied to the treatment of manufactured gases from any other sources (e.g., coal gas) which also contain vapors of valuable hydrocarbons of the type indicated.

It will be understood that the foregoing is by way of illustration and that changes, omissions, additions, substitutions, and/or modifications might be made within the scope of the claims without departing from the spirit of the invention.

I claim:

1. In a method for separating condensible resin-forming unsaturated hydrocarbons from manufactured gas containing aromatic resin-forming hydrocarbon material including styrene and also containing $C_5$ diene hydrocarbon material, wherein said gas is passed through at least one condensing zone, the improvement which comprises maintaining said zone at an exit-gas temperature sufficiently low to condense styrene from said gas but insufficiently low to condense a substantial proportion of said $C_5$ diene hydrocarbon material therefrom, whereby a condensate is separated which contains a relatively substantial amount of aromatic resin-forming unsaturated hydrocarbon material including styrene but a relatively negligible amount of $C_5$ diene hydrocarbon material, thereby substantially avoiding the formation of a condensate mixture containing readily polymerizable $C_5$ constituents difficult to separate from styrene.

2. A method for separating condensible resin-forming unsaturated hydrocarbons from a gas obtained by a process involving the pyrolytic decomposition of hydrocarbon oil, said gas containing aromatic resin-forming hydrocarbon material including considerable styrene and also containing considerable $C_5$ diene hydrocarbon material, which comprises passing said gas successively through a plurality of condensing zones for the separation of condensible hydrocarbons therefrom, and maintaining a primary condensing zone at an exit-gas temperature of at least 90° F., said temperature being sufficiently low to condense styrene from said gas but insufficiently low to condense a substantial proportion of said $C_5$ diene hydrocarbon material therefrom, to cause the separation of a condensate relatively rich in aromatic resin-forming unsaturated hydrocarbon material including styrene but substantially devoid of $C_5$ diene hydrocarbon material.

3. In a method for separating condensible resin-forming unsaturated hydrocarbons from manufactured oil gas relatively rich in resin-forming unsaturated hydrocarbons of which a material proportion comprises styrene and of which a material proportion comprises $C_5$ diene hydrocarbon material, wherein said gas is passed through at least one condensing zone, the step of maintaining said zone at an exit-gas temperature of at least 90° F., said temperature being sufficiently low to condense a large part of the styrene from said gas but insufficiently low to condense a substantial part of said $C_5$ diene hydrocarbon material therefrom, whereby a condensate is separated which contains a relatively substantial amount of aromatic resin-forming unsaturated hydrocarbon material including styrene but a relatively negligible amount of $C_5$ diene hydrocarbon material, thereby substantially avoiding the formation of a condensate mixture containing readily polymerizable $C_5$ constituents difficult when polymerized to separate from styrene.

4. A method for recovering condensible hydrocarbons from manufactured gas, said gas containing aromatic resin-forming hydrocarbon material including styrene and also containing $C_5$ diene hydrocarbon material, which comprises passing said gas through at least two condensing zones, maintaining an exit-gas temperature of at least 90° F. in a primary condensing zone, said temperature being sufficiently low to condense styrene from said gas but insufficiently low to condense a substantial proportion of said $C_5$ diene hydrocarbon material therefrom, thereby separating aromatic resin-forming unsaturated hydrocarbon material including styrene substantially free from $C_5$ diene hydrocarbons from the gas in said primary zone, separating a condensate from the gas in a second condensing zone, said second condensate containing a substantial quantity of $C_5$ diene hydrocarbon material as well as some styrene, and passing the last-named condensate before substantial polymerization of $C_5$ diene hydrocarbon material therein to a separating zone for the removal of $C_5$ diene hydrocarbon material therefrom.

5. A method for separating condensible resin-forming unsaturated hydrocarbons from manufactured gas containing aromatic resin-forming hydrocarbon material including styrene and also containing $C_5$ diene hydrocarbon material, which comprises passing said gas through a primary condensing zone the exit-gas temperature of which is maintained at least as high as 90° F., said temperature being sufficiently low to condense styrene from said gas but insufficiently low to condense a substantial proportion of said $C_5$ diene hydrocarbon material therefrom, to separate from said gas a condensate containing a considerable quantity of aromatic resin-forming unsaturated hydrocarbon material including styrene and substantially free from $C_5$ diene hydrocarbons, withdrawing said condensate from said primary condensing zone, passing the gas through another condensing zone maintained at a lower temperature to separate from the gas a second condensate containing styrene and a substantial quantity of $C_5$ diene hydrocarbon material, removing said second condensate and before substantial polymerization of $C_5$ diene hydrocarbon material therein passing it into a distilling zone, and there removing by distillation $C_5$ diene hydrocarbon material contained in said second condensate.

6. A method for recovering condensible resin-forming unsaturated hydrocarbons from a gas obtained by a process involving the pyrolytic decomposition of petroleum oil, said gas containing aromatic resin-forming hydrocarbon material including styrene and also containing $C_5$ diene hydrocarbon material, which comprises passing said gas through a primary condensing zone the exit-gas temperature of which is at least 90° F., said temperature being sufficiently low to condense styrene from said gas but insufficiently low to condense a substantial proportion of said C₅ diene hydrocarbon material therefrom, to cause the separation of a condensate relatively rich in aromatic resin-forming unsaturated hydrocarbon material but substantially free from C₅ diene hydrocarbons, withdrawing said condensate from said primary condensing zone, passing the gas through a second condensing zone maintained at a lower temperature to cause the separation of a second condensate containing styrene and a substantial quantity of C₅ diene hydrocarbon material, and before substantial polymerization of C₅ diene hydrocarbon material therein subjecting said second condensate to fractionation to substantially completely remove C₅ diene hydrocarbon material therefrom.

7. The process of claim 6 characterized by the added step of combining the second condensate after the removal of C₅ diene hydrocarbon material therefrom with the condensate from the primary condensing zone.

8. The process of claim 6 characterized by the added steps of combining C₅ diene hydrocarbon material removed from the second condensate with residual gas leaving the second condensing zone, and combining the second condensate after removal of C₅ diene hydrocarbon material therefrom with the condensate from the primary condensing zone.

EDWIN L. HALL.